United States Patent [19]
Adams et al.

[11] Patent Number: 5,547,150
[45] Date of Patent: Aug. 20, 1996

[54] MECHANICAL DEICER HAVING DECOUPLED SKIN SEGMENTS

[75] Inventors: Lowell J. Adams, Dayton; Kevin L. Leffel, Akron, both of Ohio; Gary V. Tenison, New Brighton, Minn.; Norbert A. Weisend, Jr., Cuyahoga Falls, Ohio

[73] Assignee: The B.F. Goodrich Company, Akron, Ohio

[21] Appl. No.: 216,001

[22] Filed: Mar. 22, 1994

[51] Int. Cl.$^6$ ..................................... B64D 15/16
[52] U.S. Cl. .......................................... 244/134 R
[58] Field of Search ............................ 244/134 R, 134 D, 244/134 B, 123, 131, 132, 117 R, 119

[56] References Cited

U.S. PATENT DOCUMENTS

| | | | |
|---|---|---|---|
| 2,432,669 | 12/1947 | Kliever | 244/134 A |
| 4,613,102 | 9/1986 | Kageorge | 244/134 A |
| 5,129,598 | 7/1992 | Adams et al. | 244/134 A |
| 5,356,096 | 10/1994 | Rauckhorst et al. | 244/134 A |

FOREIGN PATENT DOCUMENTS

| | | | |
|---|---|---|---|
| 117437 | 8/1943 | Australia | 244/134 A |
| 505433 | 5/1939 | United Kingdom | 244/134 A |
| 542878 | 1/1942 | United Kingdom | 244/134 A |

*Primary Examiner*—Galen L. Barefoot
*Attorney, Agent, or Firm*—Richard A. Romanchik

[57] ABSTRACT

A deicer for attachment to an airfoil substructure includes a segmented outer shell, with adjacent segments being decoupled from one another utilizing elastomeric decoupling members. The outer edges of the outer periphery shell segments are likewise decoupled from the airfoil structure utilizing elastomeric decoupling members. Each segment of the deicer is deflected by a respective deflection means which are provided energy from a controller.

25 Claims, 4 Drawing Sheets

5,547,150

MECHANICAL DEICER HAVING DECOUPLED SKIN SEGMENTS

TECHNICAL FIELD

This invention relates to airfoil deicers, and more particularly, to a mechanical deicer having a skin with decoupled segments.

BACKGROUND OF THE INVENTION

Under certain operating conditions aircraft are vulnerable to accumulation of ice on component surfaces. If left unchecked, such accumulations can eventually so laden the aircraft with additional weight and so alter the airfoil configuration of the wings as to cause undesirable flying conditions. A wide variety of systems have been proposed for removing ice from aircraft during flight or for preventing its accumulation on the leading edge surfaces of such aircraft. These systems can be categorized in three ways: thermal, chemical and mechanical.

The mechanical category of deicing systems covers a wide range of devices, all of which distort the airfoil surface in some manner so as to shed ice from the airfoil surface. A subcategory of mechanical deicing systems are high impact mechanical deicing systems which utilize high surface accelerations (normal to the surface) and strain to break and debond accumulated ice. Representative of such high impact systems are the electro-expulsive deicer, the eddy current deicer, the pneumatic impulse ice protection deicer, and the electro-impact deicing system. An example of electro-expulsive deicing systems can be found in three disclosures discussed hereinafter.

In U.S. Pat. No. 3,809,341 to Levin et al., flat buses are arranged opposite one another with one side of each bus being adjacent an inner or obverse surface of an ice collecting wall. An electric current is passed through each bus and the resulting interacting magnetic fields force the buses apart and deform the ice collecting walls. The disadvantage of this system is that each bus operates on the outer skin of the airfoil and a predetermined skin deflection is required to provide a set level of ice removal. Operating power needs often result in bus areas substantially smaller than skin areas, thereby necessitating large force requirements in order to generate the needed amount of skin deflection. Such high skin deflections are believed likely to cause fatigue in the skin.

U.S. Pat. No. 4,690,353 to Haslim et al. discloses a system wherein one or more overlapped flexible ribbon conductors are embedded in an elastomeric material affixed to the outer surface of an airfoil structure. The conductors are fed large current pulses and the resulting interacting magnetic fields produce an electro-expulsive force which distends the elastomeric member and separates the elastomeric member from a solid body such as ice thereon. The conductors in a single conductive layer as disclosed by Haslim et al. have a serpentine or zig-zag configuration.

Commonly owned U.S. Pat. No. 4,875,644 to Adams et al. discloses an electro-expulsive deicing system wherein a plurality of expulsive elements are placed in different layers on the airfoil surface, with each element being comprised of electrically conductive members interconnected such that electric current flowing in the conductive members flows in the same direction in adjacent electrically conductive members in a first sheet-like array and also flows in adjacent electrically conductive members of a second sheet-like array in a direction opposite to the first.

Commonly owned U.S. Pat. No. 4,706,911 and 4,836,474 disclose a high pressure pneumatic impulse deicer comprised of an outer skin having a substantially elevated modulus, and a pneumatic deflection means to deflect the skin in a short time span.

Metal weathering surfaces are commonly used as a durable, aerodynamic material in high impact mechanical deicing systems as described above. By common aircraft practice, the metal surface is formed to cover the airfoil shaped leading edge section to extend aft and be supported or attached to a spar or stringer for a wing or tail upper and lower surface or a former/bulk head center line to aft for an inlet. The extent or length of a given representative deicing element is substantially less than the metal surface that covers it. The deicer element impulse that causes the ice removing metal surface acceleration is restrained by the metal surface curvature and metal strain since it is fixed in place at its attachment points. Additional restriction to the deicing action comes from any bonding mechanism attaching the metal outer surface to the airfoil either directly or indirectly through other deicer elements. The metal surface strain is affected by its modulus of elasticity and thickness.

Both elements of the deicing action are inhibited by increased stiffness of a metal surface formed over smaller leading edge radius airfoil sections. The ice de-bonding acceleration impact action can be limited by any or all of these factors in combination on a metal surface: surface curvature, size of element relative to metal surface size, attachment mechanism of metal surface to the airfoil, metal modulus of elasticity and thickness and size of the airfoil leading edge radius.

Efforts to improve such mechanical deicing systems have led to continuing developments to improve their versatility, practicality and efficiency.

DISCLOSURE OF THE INVENTION

According to one embodiment of the present invention, there is provided a deicing apparatus for an airfoil comprising:
  a first shell segment;
  deflection means disposed beneath said first shell segment for deflecting said first shell segment when energized;
  a second shell segment disposed adjacent said first shell segment; and,
  elastomeric decoupling means for resiliently connecting said first and second shell segments.

According to an alternative embodiment of the present invention, there is provided a deicing apparatus for an airfoil having a first shell segment, said deicing apparatus comprising:
  a second shell segment adapted for disposal adjacent said first shell segment for providing a smooth outer airfoil surface;
  deflection means disposed beneath said second shell segment for deflecting said second shell segment when energized; and,
  elastomeric decoupling means for resiliently connecting said first and second shell segments.

According to an alternative embodiment of the present invention, there is provided a method of deicing an airfoil comprising the steps of:
  providing a plurality of shell segments arranged in a predetermined pattern;

deflecting said plurality of shell segments in a predetermined sequence; and, resiliently connecting adjacent ones of said plurality of shell segments.

The present invention provides a multiplicity of outer shell segments with surface dynamics independent of one another, so that adjacent shell segments do not dampen or interfere with each other.

These and other objects, features, and advantages of the present invention will become more apparent in light of the detailed description of exemplary embodiments thereof, as illustrated by the drawings.

BEST MODE FOR CARRYING OUT THE INVENTION

Figure 1:
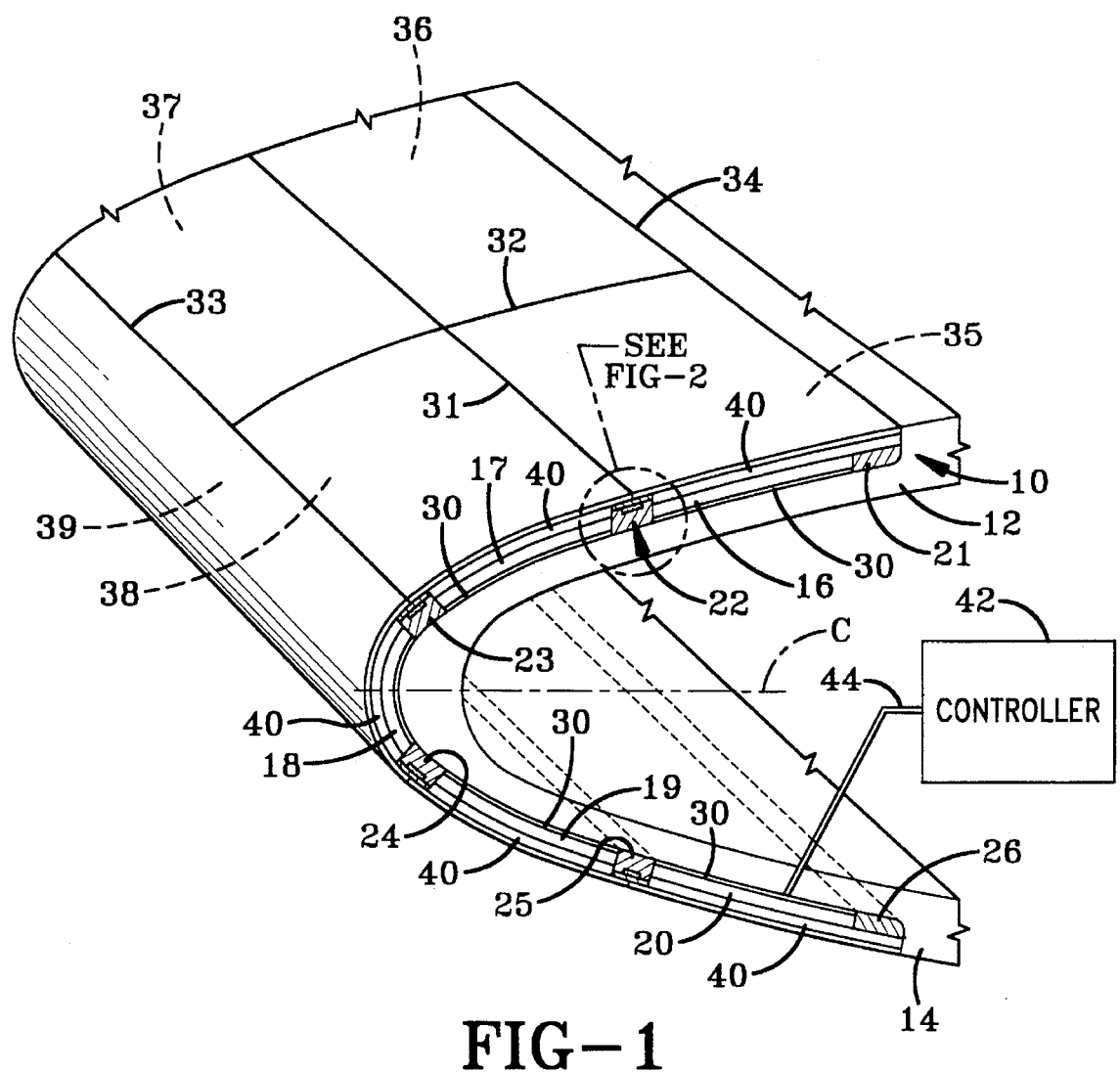
FIG. 1 is an isometric view of a deicer in accordance with the present invention.

Referring now to FIG. 1, a deicer 10 is shown attached to an airfoil substructure 12. Deicer 10 includes an outer skin or shell 14, a plurality of deflection means 16–20, a plurality of elastomeric decouplers 21–26, and a bottom layer 30. Outer shell 14 is comprised of a plurality of outer shell segments 35–39 and a backing layer 40. The substructure 12 and deicer 10 have an apex and are bisected by a centerline C. Lines 31–34 define the outer boundaries of deflection means 16–20, each deflection means having at least one mechanical deflection element provided therein to cause deformation of the outer shell 10 covering the area over the element(s). For instance, deflection means 16–20 may comprise expandable tubes such as described by the Integral Expulsive System Patent, U.S. Pat. No. 5,098,037, or the deflection means 16–20 can take forms utilizing electromagnetic apparatus, such as those presented in U.S. Pat. Nos. 5,129,598 and 5,152,480, the disclosures of which are fully incorporated herein by reference. A controller 42 controls deflection means 16–20 via a line 44.

Each deflection means causes deflection of its respective outer shell segment 35–39. For instance deflection means 16 causes deflection of shell segment 35, deflection means 17 causes deflection of shell segment 38, deflection means 18 causes deflection of shell segment 39, etc.. Deflection means 16–20 may be any of a number of active elements utilized to cause mechanical deflection of an outer shell.

Elastomeric decoupling elements 21, 26 decouple the outer shell 14 from the airfoil substructure 12 at the outer chordwise edges of the deicer 10. Elastomeric decoupling elements 22–25 decouple the various shell segments from each other along joints parallel to the leading edge, as well as joints normal to the leading edge.

Figure 2:
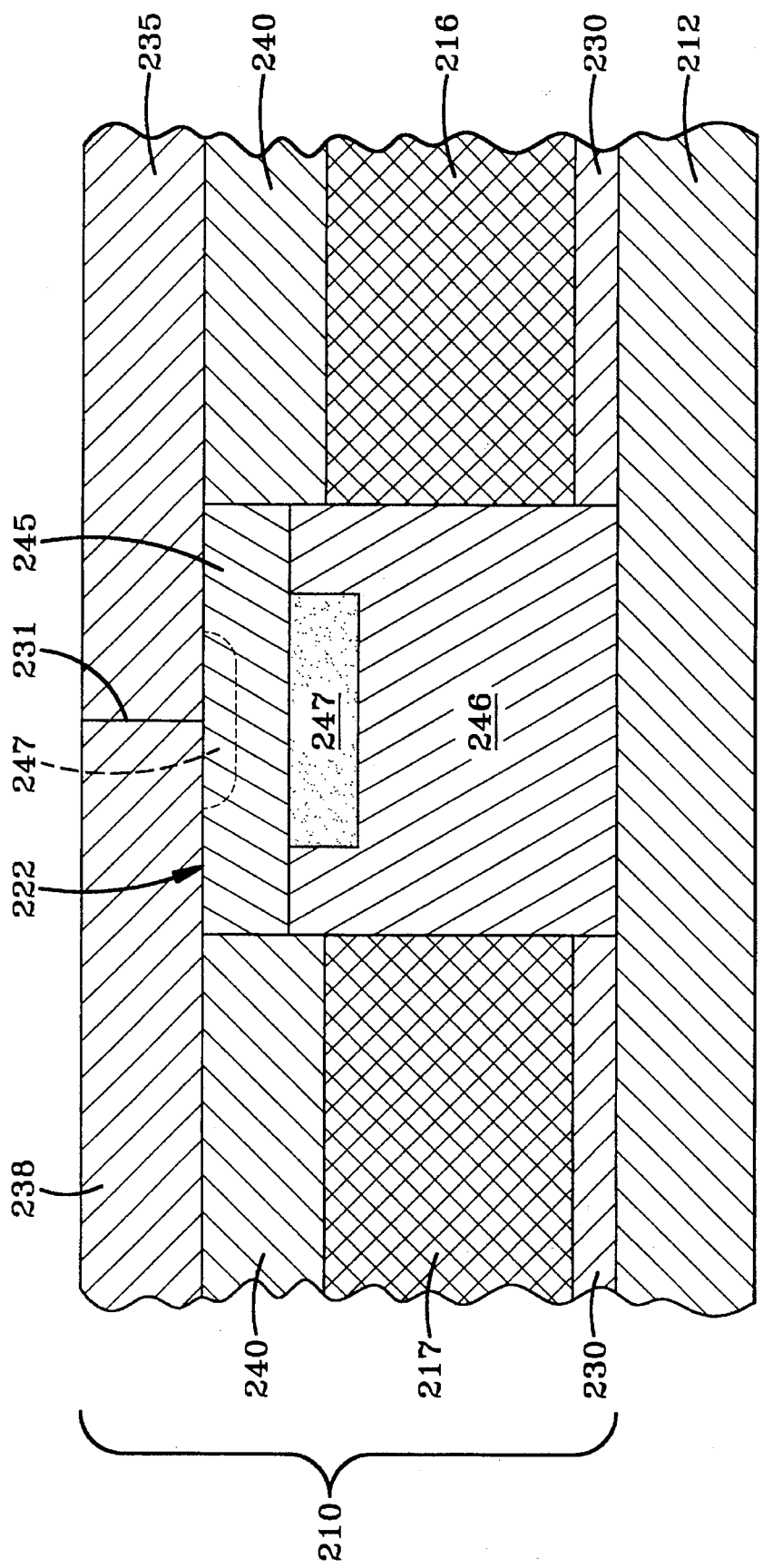
FIG. 2 is an enlarged, fragmentary, cross-sectional view of a section of the deicer of FIG. 1, in accordance with the present invention.

Referring now to FIG. 2, wherein a deicing system is generally similar to the deicing system embodiments illustrated hereinbefore in the previous figures and is thus indicated by reference numerals corresponding to those discussed above, except that a 2XX "prefix" is utilized. In one embodiment, a deicer 210 which is attached to an airfoil substructure 212, includes a first outer shell segment 235 disposed adjacent a second shell segment 238, having a line 232 defined therebetween. Each shell segment 235, 238 is disposed on a backing layer 240, which is disposed on a respective deflection means 216, 217 for each shell segment. Each deflection means 216, 217 is disposed on a bottom layer 230 which attaches the deicer 210 to the airfoil substructure 212. Shell segments 235, 238 are decoupled from one another by a decoupler element 222 which includes a top elastomeric decoupling layer 245 disposed over a bottom decoupling layer 246, and a rigid stiffener or strength member 247. Continuity of the outer shell is maintained by stiffeners 247. The resilient layer 245 allows the deflection elements 216, 217 to deflect each shell segment 235, 238 independently of one another, because the elastomeric layer 245 is resilient transfers a limited amount of tension. It is to be noted that decoupling member 222 runs the length of the deicer 210 in the span wise direction. Other separation lines, such as line 32 in FIG. 1, run in the chordwise direction. Shell 235, 238, backing layer 240, deflection means 216, 217, bottom layer 230, top decoupling layer 245, bottom decoupling layer 246, and stiffener 247 are preferably bonded to one another utilizing appropriate bonding agents.

It is to be noted that items 245, 246, and 247 are indicative of the decoupling elements 22–25 in FIG. 1 which decouple the various shell segments from each other. The preferred material for decouplers 21, 26 in FIG. 1 (which decouple the outer shell 14 from the airfoil substructure 12 at the outer chordwise edges of the deicer 10) is a 0.010 to 0.100 thick elastomer, such as chloroprene rubber, chlorobutyl rubber, silicone elastomer, polyurethane elastomer or the like. The upper limit for the durometer of the material utilized should be about a Shore D 70, but preferably less than Shore A 90.

The preferred material for outer shell segments 235, 238 is a 0.005 inch thick sheet of metal, such as aluminum, titanium or stainless steel. However, the outer shell may be comprised of any of a number of other suitable resilient materials, such as polyetheretherketone (PEEK).

The preferred material for backing layer 240 is about 0.005 to 0.010 inch thick layer of epoxy adhesive film.

It is to be noted that outer segments 235, 238 and backing layer 240 may be comprised of a plastic composite outer shell such as disclosed in copending and co-owned patent application Ser. No. 07/998,360 for an IMPROVED SKIN FOR A DE-ICER, Rauckhorst et al. which is hereby incorporated herein by reference.

The preferred bottom layer 230 is about 0.005 to 0.010 inch thick layer of epoxy adhesive film.

The preferred material for top elastomeric layer 245 is low temperature material such as silicone rubber or other elastomeric material, such as chloroprene rubber, chlorobutyl rubber, silicone elastomer, polyurethane elastomer or the like. The upper limit for the durometer of the material utilized should be about a Shore D 70, but preferably less than Shore A 90.

The preferred material for stiffener 247 is one having properties similar to that of the outer shell segment.

The preferred material for lower elastomeric member 246 is similar to that used for elastomeric member 245.

Alternatively, members 245 and 246 can be comprised of suitably stiff, high dielectric material, such as a silicone based material.

An area 247 in close proximity to division line 232 may be adhesive free, that is the bonding agent utilized to attach shell segments 235, 238 to backing layer 240 is not placed in the area 248 in order to reduce stress concentrations in the elastomer at division line 232.

Figure 3:
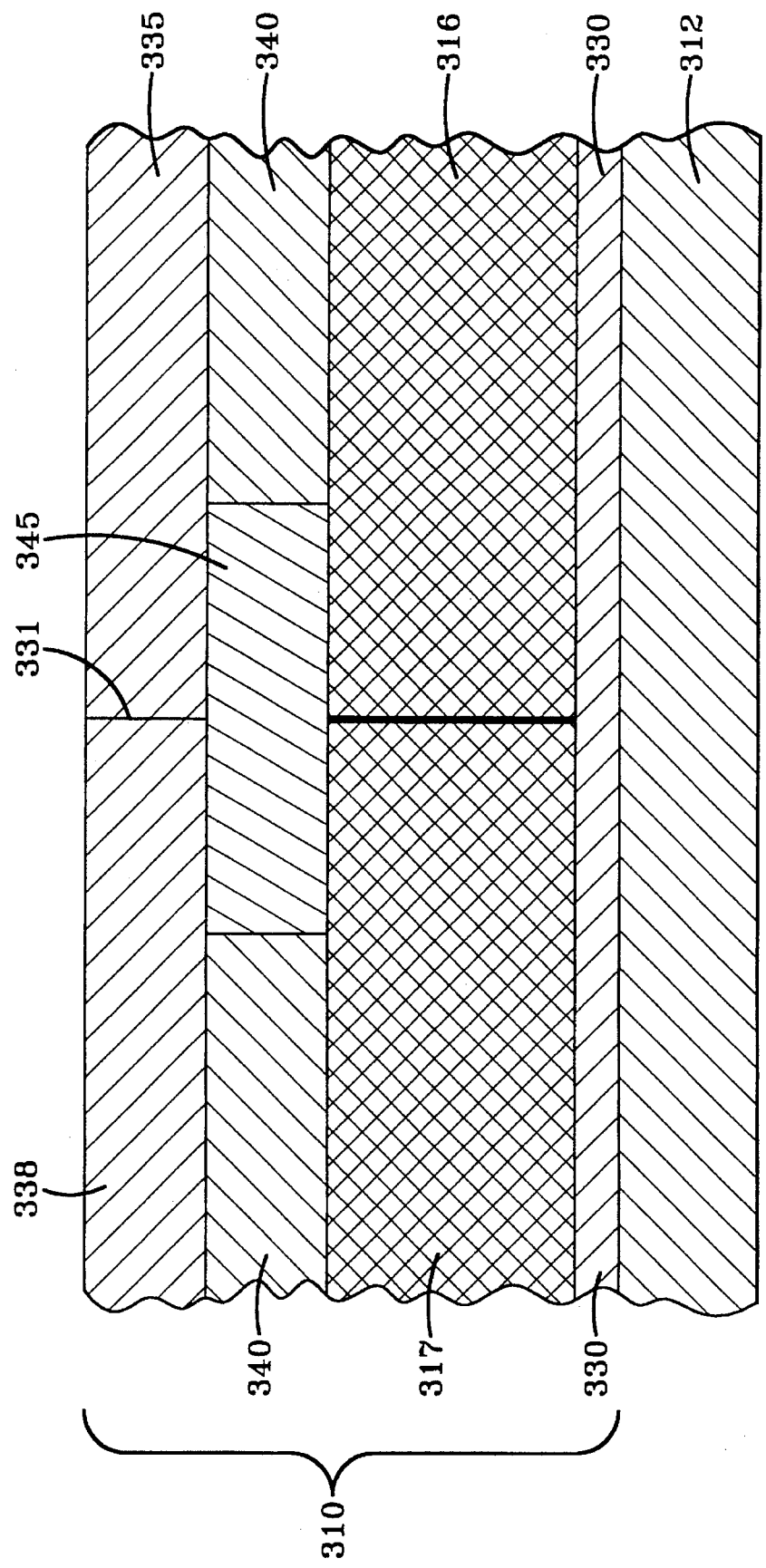
FIG. 3 is an enlarged, fragmentary, cross-sectional view of a section of a deicer in accordance with an alternative embodiment of present invention.

Referring now to FIG. 3, wherein a deicing system is generally similar to the deicing system embodiments illustrated hereinbefore in the previous figures and is thus indicated by reference numerals corresponding to those discussed above, except that a 3XX "prefix" is utilized. In an alternative embodiment, a deicer 310 includes shell segments 335, 338, backing layer 340, deflection means 316, 317, bottom layer 330, all of which are disposed on airfoil substructure 312. Elastomeric decoupler 345 decouples shell segment 335 and segment 338 from each other along division line 332.

Figure 4:
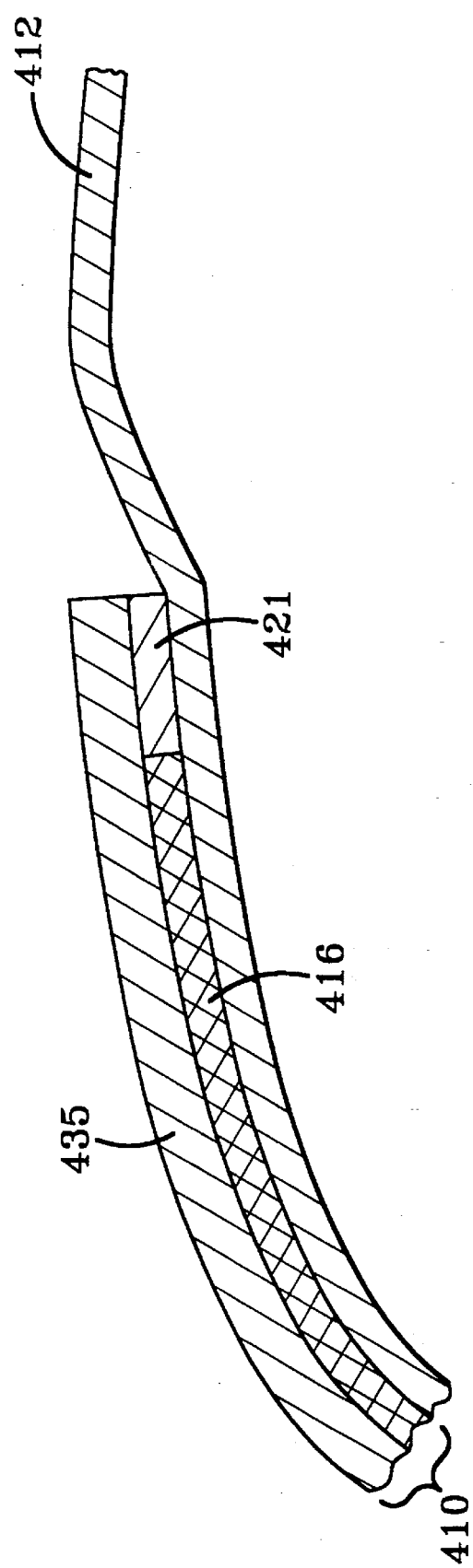
FIG. 4 is an enlarged, fragmentary, cross-sectional view of a section of the trailing edge of a deicer in accordance with an alternative embodiment of present invention.

Referring now to FIG. 4, wherein a deicing system is generally similar to the deicing system embodiments illustrated hereinbefore in the previous figures and is thus indicated by reference numerals corresponding to those discussed above, except that a 4XX "prefix" is utilized. In an alternative embodiment, a deicer 410 includes an outer shell segment 435 overlying a deflection means 416. Shell segment 435 is decoupled from airfoil substructure 412 utilizing elastomeric decoupling element 421.

Although the invention has been shown and described with exemplary embodiments thereof, it should be understood by those skilled in the art of the foregoing and various other changes, omissions and additions may be made therein and thereto without departing from the spirit and the scope of the invention.

We claim:

1. A deicing apparatus for an airfoil comprising:

first outer shell segment having outer edges;

deflection means disposed beneath said first outer shell segment for deflecting said first outer shell segment when energized;

a second outer shell segment having outer edges and disposed adjacent said first outer shell segment so that adjacent outer edges of said first and second outer shell segments define a division line therebetween; and, elastomeric decoupling means for resiliently connecting said first to second outer shell segment across said division line.

2. A deicing apparatus for an airfoil in accordance with claim 1, wherein said decoupling means comprises an elastomeric member having stiffener means provided therein for reinforcing said elastomeric member.

3. A deicing apparatus for an airfoil in accordance with claim 1, wherein said decoupling means comprises a first elastomeric member for connecting said first and second outer shell segments and a second elastomeric member disposed beneath said first elastomeric member for supporting said first elastomeric member and said first and second outer shell segments.

4. A deicing apparatus for an airfoil in accordance with claim 1, wherein said decoupling means comprises:

a first elastomeric member for connecting said first and second outer shell segments;

a second elastomeric member disposed beneath said first elastomeric member for supporting said first elastomeric member and said first and second outer shell segments; and, stiffener means provided therein for reinforcing said first and second elastomeric members.

5. A deicing apparatus for an airfoil in accordance with claim 1, wherein said deflection means comprises an electromagnetic apparatus.

6. A deicing apparatus for an airfoil in accordance with claim 1, wherein said deflection means comprises a pneumatic apparatus.

7. A deicing apparatus for an airfoil in accordance with claim 1, wherein said first and second outer shell segments are comprised of a metal.

8. A deicing apparatus for an airfoil in accordance with claim 1, wherein said first and second outer shell segments are comprised of a plastic composite.

9. A deicing apparatus for an airfoil in accordance with claim 1, further comprising controller means for controlling and energizing said deflection means.

10. A deicing apparatus for an airfoil having a first outer shell segment with outer edges, said deicing apparatus comprising:

a second outer shell segment with outer edges and adapted for disposal adjacent said first outer shell segment so that adjacent outer edges of said first and second outer shell segments define a division line therebetween;

deflection means disposed beneath said second outer shell segment for deflecting said second outer shell segment when energized; and, elastomeric decoupling means for resiliently connecting said first to second outer shell segments across said division line.

11. A deicing apparatus for an airfoil in accordance with claim 10, wherein said decoupling means comprises an elastomeric member having stiffener means provided therein for reinforcing said elastomeric member.

12. A deicing apparatus for an airfoil in accordance with claim 10, wherein said decoupling means comprises a first elastomeric member for connecting said first and second outer shell segments and a second elastomeric member disposed beneath said first elastomeric member for supporting said first elastomeric member and said first and second outer shell segments.

13. A deicing apparatus for an airfoil in accordance with claim 10, wherein said decoupling means comprises:

a first elastomeric member for connecting said first and second outer shell segments;

a second elastomeric member disposed beneath said first elastomeric member for supporting said first elastomeric member and said first and second outer shell segments; and, stiffener means provided therein for reinforcing said first and second elastomeric members.

14. A deicing apparatus for an airfoil in accordance with claim 10, wherein said deflection means comprises an electromagnetic apparatus.

15. A deicing apparatus for an airfoil in accordance with claim 10, wherein said deflection means comprises a pneumatic apparatus.

16. A deicing apparatus for an airfoil in accordance with claim 10, wherein said second outer shell segment is comprised of a metal.

17. A deicer for an airfoil comprising:

a plurality of outer shell segments having outer edges and disposed adjacent one another so that adjacent outer edges of adjacent outer shell segments define a division lines therebetween;

deflection means disposed beneath at least a selected one of said plurality of outer shell segments for deflecting said selected outer shell segment when energized; and, a plurality of elastomeric decoupling means for resiliently connecting adjacent ones of said plurality of outer shell segments across said division lines.

18. A deicing apparatus for an airfoil in accordance with claim 10, wherein said second outer shell segment is comprised of a plastic composite.

19. A deicer for an airfoil in accordance with claim 18, wherein at least one of said plurality of elastomeric decoupling means resiliently connects at least one of said plurality of outer shell segments to the airfoil.

20. A method of deicing an airfoil comprising the steps of:

arranging a plurality of outer shell segments having outer edges in a predetermined pattern so that division lines are defined between adjacent outer shell segments by said outer edges;

resiliently connecting adjacent ones of said plurality of outer shell segments across said division lines; and, deflecting said plurality of outer shell segments in a predetermined sequence.

21. A method of deicing an airfoil in accordance with claim 20, further comprising the step of resiliently connecting at least one of said plurality of outer shell segments to the airfoil.

22. A method of deicing an airfoil in accordance with claim 20, wherein said resiliently connecting step comprises connecting said plurality of shell segments utilizing an elastomeric means.

23. A method of deicing an airfoil in accordance with claim 21, wherein said resiliently connecting at least one of said plurality of outer shell segments to the airfoil step comprises connecting said plurality of shell segments utilizing an elastomeric means.

24. A method of deicing an airfoil comprising the steps of:

dividing an outer skin into a plurality of segments along defined division lines through said outer skin so as to increase the degree of movement of any one segment; and, resiliently connecting said plurality of segments with decoupling means across said division lines.

25. A deicing apparatus for an airfoil in accordance with claim 1, wherein said second shell segment is integral with the airfoil.

\* \* \* \* \*